US008592044B2

(12) United States Patent
Birkner et al.

(10) Patent No.: US 8,592,044 B2
(45) Date of Patent: Nov. 26, 2013

(54) CERAMIC HEAT-INSULATING LAYERS HAVING INCREASED CORROSION RESISTANCE TO CONTAMINATED FUELS

(75) Inventors: Jens Birkner, Oberhausen (DE); Knut Halberstadt, Mülheim an der Ruhr (DE); Eckart Schumann, Mülheim an der Ruhr (DE); Werner Stamm, Mülheim an der Ruhr (DE)

(73) Assignee: Siemens Aktiengesellschaft, München (DE)

( * ) Notice: Subject to any disclaimer, the term of this patent is extended or adjusted under 35 U.S.C. 154(b) by 612 days.

(21) Appl. No.: 12/865,910

(22) PCT Filed: Dec. 4, 2008

(86) PCT No.: PCT/EP2008/066809

§ 371 (c)(1), (2), (4) Date: Aug. 3, 2010

(87) PCT Pub. No.: WO2009/097931

PCT Pub. Date: Aug. 13, 2009

(65) Prior Publication Data

US 2010/0329882 A1 Dec. 30, 2010

(30) Foreign Application Priority Data

Feb. 4, 2008 (EP) .................................... 08002050

(51) Int. Cl.

| | |
|---|---|
| ***B32B 15/04*** | (2006.01) |
| ***B32B 9/00*** | (2006.01) |
| ***C01G 31/02*** | (2006.01) |
| ***C04B 35/48*** | (2006.01) |
| ***F01D 5/14*** | (2006.01) |

(52) U.S. Cl.

USPC ........ 428/472; 428/702; 423/594.8; 501/102; 416/241 B

(58) Field of Classification Search

None

See application file for complete search history.

(56) References Cited

U.S. PATENT DOCUMENTS

| | | | | | |
|---|---|---|---|---|---|
| 4,255,495 | A * | 3/1981 | Levine et al. | ................. | 428/632 |
| 4,761,346 | A * | 8/1988 | Naik | ............................ | 428/627 |
| 5,236,787 | A | 8/1993 | Grassi | | |
| 5,667,898 | A | 9/1997 | Anderson | | |
| 2004/0115471 | A1 * | 6/2004 | Nagaraj et al. | ................ | 428/660 |
| 2007/0248764 | A1 | 10/2007 | Friedrich | | |

FOREIGN PATENT DOCUMENTS

| | | | | | |
|---|---|---|---|---|---|
| DE | 36 44 664 | A1 | 7/1988 | | |
| DE | 198 01 424 | A1 | 7/1999 | | |
| EP | 0 494 389 | A1 | 7/1992 | | |
| GB | 1391827 | * | 4/1975 | ............... | C23D 5/00 |
| WO | WO 95/14117 | * | 5/1995 | ............. | C23C 22/40 |

* cited by examiner

*Primary Examiner* — Gwendolyn Blackwell
*Assistant Examiner* — Seth Dumbris

(57) ABSTRACT

Ceramic coatings for a component that is subjected to high temperatures, especially for a turbine blade are provided. The ceramic coatings contain one or more compounds that are selected from alkaline earth silicates, $ZrV_2O_7$ and $Mg_3(VO_4)_2$. A layer system including at least one coating of the ceramic coating is also provided.

15 Claims, No Drawings

CERAMIC HEAT-INSULATING LAYERS HAVING INCREASED CORROSION RESISTANCE TO CONTAMINATED FUELS

CROSS REFERENCE TO RELATED APPLICATIONS

This application is the US National Stage of International Application No. PCT/EP2008/066809, filed Dec. 4, 2008 and claims the benefit thereof. The International Application claims the benefits of European Patent Office application No. 08002050.6 EP filed Feb. 4, 2008. All of the applications are incorporated by reference herein in their entirety.

FIELD OF INVENTION

The present invention relates to a ceramic coating for a component which is exposed to high temperatures, in particular ceramic coatings for a turbine blade.

BACKGROUND OF INVENTION

Ceramic coatings for turbine blades are known, for example, from DE 198 01 424. The ceramic coatings described in that application concern compositions consisting essentially of barium zirconate and/or lanthanum zirconate and/or strontium zirconate.

Furthermore, coatings based on zirconium dioxide or zirconium dioxide partially stabilized by addition of yttrium oxide for turbine blades are known.

A disadvantage of yttrium-stabilized zirconium ceramics is that when they are used as coating for turbine blades operated under heavy oil conditions they can be subject to decomposition phenomena.

SUMMARY OF INVENTION

It is an object of the present invention to provide a ceramic coating for components of the type mentioned at the outset, which coating has good thermal barrier properties combined with high stability even in aggressive environments.

The object is achieved according to the invention by a ceramic coating containing one or more compounds selected from among alkaline earth metal silicates, $ZrV_2O_7$ and $Mg_3(VO_4)_2$.

DETAILED DESCRIPTION OF INVENTION

The invention is based on the recognition that the ceramic coatings based on yttrium-stabilized zirconium oxide which are usually used for turbine blades are decomposed by attack by sodium, potassium, vanadium or magnesium. These elements occur primarily during operation of a gas turbine under heavy oil conditions or on contact with synthesis gases which have undergone little purification. Here, contact of the yttrium oxide-stabilized zirconia ceramic with the abovementioned elements leads, in detail, to destabilization of the yttrium oxide, as a result of which the ceramic is destroyed.

The ceramic coatings described in the present invention now make it possible to equip gas turbine blades with thermal barrier layers which can also be operated under the abovementioned aggressive conditions without the ceramic coatings being attacked.

The ceramic coatings of the invention can be used generally for components which are exposed to high temperatures.

One possible process for producing such a coating is to apply a coating of the type according to the invention to a substrate prescribing the basic shape of the component.

Coating can be effected by physical vapor deposition (PVD), in particular by electron beam physical vapor deposition (EB-PVD). The coating can also be applied by plasma spraying, in particular by atmospheric plasma spraying.

In a preferred embodiment of the coating of the invention, the coating contains at least 90% by weight, in particular at least 95% by weight, particularly preferably greater than 99% by weight, of $Al_2TiO_5$, alkaline earth metal silicates, magnesium titanates, $ZrV_2O_7$ and $Mg_3(VO_4)_2$. This is particularly advantageous since ceramics composed of these compounds have good thermal barrier properties combined with high resistance to aggressive environments even without further additives. It is particularly advantageous for the coating of the invention to consist exclusively of the abovementioned compounds, in particular of only one of the abovementioned compounds. Here, the presence of small amounts of contamination, in particular in the order of less than 1% by weight, in particular less than 0.1% by weight, is possible.

In a preferred embodiment of the coating of the invention, the alkaline earth metal silicates are selected from among steatite, cordierite, barium silicate and calcium silicate. Preference is likewise given to the magnesium titanates being selected from $Mg_2TiO_4$. This is particularly advantageous since coatings composed of ceramic materials of this type have a particularly high resistance to attack by sodium, potassium, vanadium or magnesium.

In a further preferred embodiment, the coating of the invention has no additional stabilizers. This is particularly advantageous since the coatings of the invention can then be applied as single-phase system. Possible errors in the weighing out of stabilizing additives can therefore be ruled out from the beginning. The possibility of dispensing with the addition of stabilizers is due to the high resistance of the coatings of the invention even in aggressive environments.

In a particularly preferred embodiment of the present invention, the coatings of the invention are very largely free of yttrium oxide. The coatings of the invention very particularly preferably do not contain any yttrium oxide. This is particularly advantageous since stabilizer which is customarily used in coating ceramics for turbine blades is responsible for the destruction of the ceramic materials under the above-described aggressive conditions. In contrast, the coatings of the invention make do without the addition of yttrium or yttrium oxide.

In a particularly preferred embodiment of the present invention, the coating has a thickness of from 200 to 1000 μm, in particular from 200 to 500 μm. Coatings which are applied in these thicknesses to the components to be coated have the particular advantage that even in the case of coatings of this thickness satisfactory thermal insulation of the underlying material combined with good stability toward aggressive environments is ensured.

The present invention further provides a layer system containing at least one coating of the type according to the invention.

A particularly preferred layer system is formed by a coating according to the invention being applied to a layer of partially stabilized zirconium oxide which is already present on the component. If appropriate, further layers, in particular bonding layers, can be inserted between the layer of partially stabilized zirconium oxide and the component surface. A multilayer system of this type is particularly advantageous since the intermediate layer of partially stabilized zirconium oxide can compensate for possible differences in the coefficients of thermal expansion of the coatings according to the invention and the base material, as a result of which the thermal stability of the coating can be increased. Turbines coated with the layer systems according to the invention can therefore be operated at higher temperatures. This is relevant particularly because the operating efficiency of turbines increases with the operating temperature thereof.

The present invention further provides for the use of a coating according to the invention or a layer system containing a coating according to the invention as thermal barrier layer for a component which is exposed to high temperatures. This is particularly advantageous since the coatings and layer systems of the invention have good thermal barrier properties combined with high stability even in aggressive environments. These properties are particularly advantageous when such a coating or such a layer system is used as coating for a turbine blade, in particular a turbine blade for a steam turbine.

The present invention further provides a turbine blade which has a coating according to the invention or a layer system of the abovementioned type. This is particularly advantageous since turbine blades having such ceramic coatings have a very high heat resistance, especially when used in a steam turbine, and owing to the good stability of the coating or the layer systems toward aggressive environments can be operated at high temperatures even under heavy oil conditions or when in contact with synthesis gases which have undergone little purification.

The invention claimed is:

1. A ceramic coating for a component which is exposed to high temperatures, comprising:
- a compound selected from the group consisting of $ZrV_2O_7$ and $Mg_3(VO_4)_2$,
- wherein a content $ZrV_2O_7$ and/or $Mg_3(VO_4)_2$ in the coating is at least 90% by weight.

2. The ceramic coating as claimed in claim 1, wherein the component is a turbine blade.

3. The coating as claimed in claim 1, wherein the content is at least 95% by weight.

4. The coating as claimed in claim 1, wherein the coating includes no stabilizers.

5. The coating as claimed in claim 1, wherein the coating is essentially free of yttrium.

6. The coating as claimed in claim 1, wherein the coating includes a thickness of 200 to 1000 μm.

7. The coating as claimed in claim 6, wherein the coating includes a thickness of 200 to 500 μm.

8. A layer system, comprising:
- a ceramic coating comprising:
  - a compound selected from the group consisting of $ZrV_2O_7$ and $Mg_3(VO_4)_2$,
- wherein a content of $ZrV_2O_7$ and/or $Mg_3(VO_4)_2$ in the coating is at least 90% by weight.

9. The layer system as claimed in claim 8, wherein the ceramic coating is applied to a layer of partially stabilized zirconium oxide.

10. The layer system as claimed in claim 8, wherein the content is at least 95% by weight.

11. The layer system as claimed in claim 8, wherein the coating includes no stabilizers.

12. The layer system as claimed in claim 8, wherein the coating is essentially free of yttrium.

13. The layer system as claimed in claim 8, wherein the coating includes a thickness of 200 to 1000 μm.

14. The layer system as claimed in claim 13, wherein the coating includes a thickness of 200 to 500 μm.

15. A turbine blade, comprising:
- a layer system, comprising:
  - a ceramic coating, comprising:
    - a compound selected from the group consisting of $ZrV_2O_7$ and $Mg_3(VO_4)_2$,
- wherein a content of $ZrV_2O_7$ and/or $Mg_3(VO_4)_2$ in the coating is at least 90% by weight.

* * * * *